C. A. HOTCHKISS.
CURRY-COMB.

No. 174,907. Patented March 21, 1876.

WITNESSES
Robert Everett
George W. Larner

INVENTOR
Charles A. Hotchkiss
Gilmore, Smith & Co.
ATTORNEYS.

N. PETERS, PHOTO-LITHOGRAPHER, WASHINGTON, D. C.

5 Sheets—Sheet 2.
C. A. HOTCHKISS.
CURRY-COMB.
No. 174,907. Patented March 21, 1876.
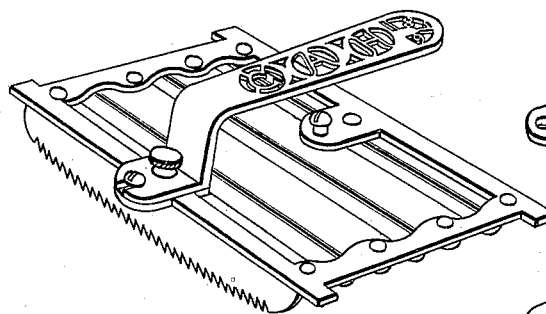
Fig. 9.
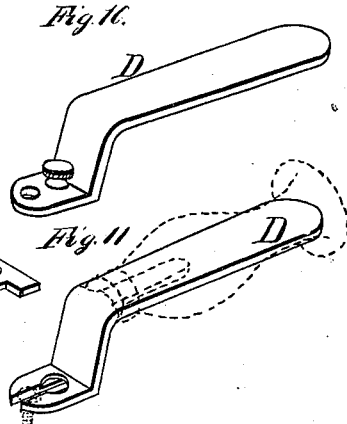
Fig. 10.
Fig. 11.
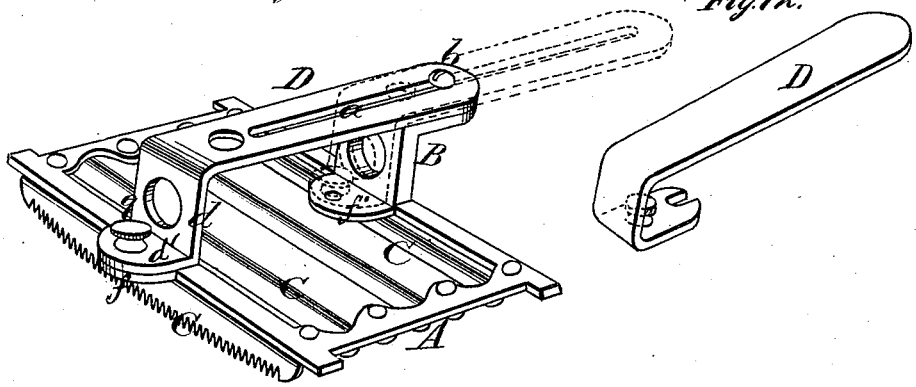
Fig. 8.
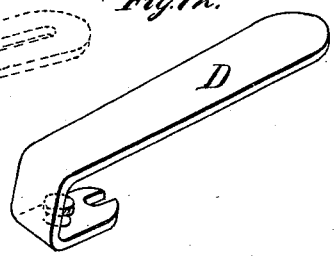
Fig. 12.
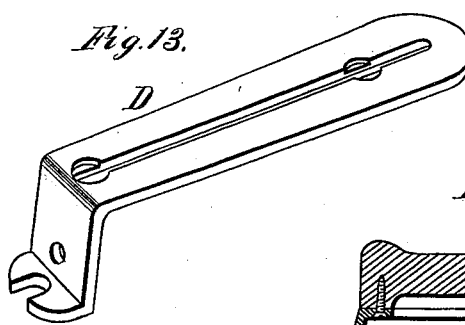
Fig. 13.
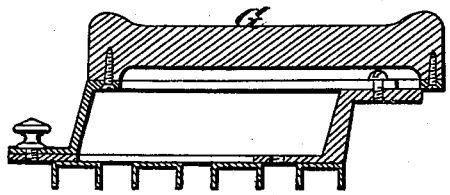
Fig. 14.
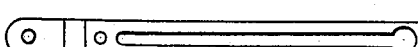
Fig. 15.
WITNESSES
Robert Everett
Chas. W. Searle
INVENTOR
Chas. A. Hotchkiss
Gilmore, Smith & Co.
ATTORNEYS.

C. A. HOTCHKISS.
CURRY-COMB.
No. 174,907. Patented March 21, 1876.
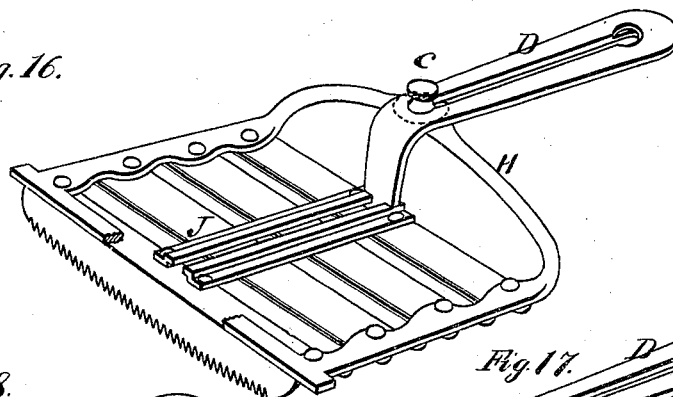
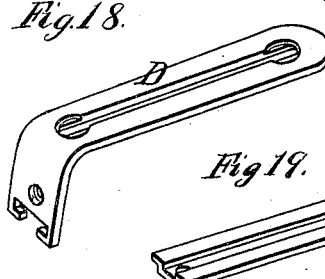
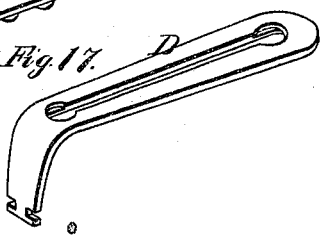
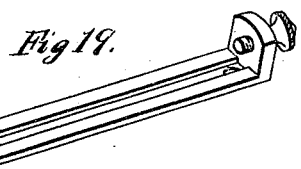
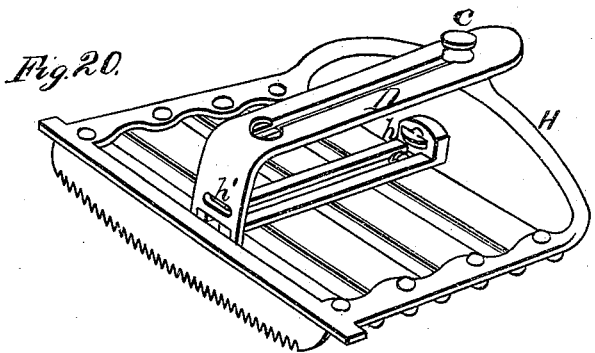
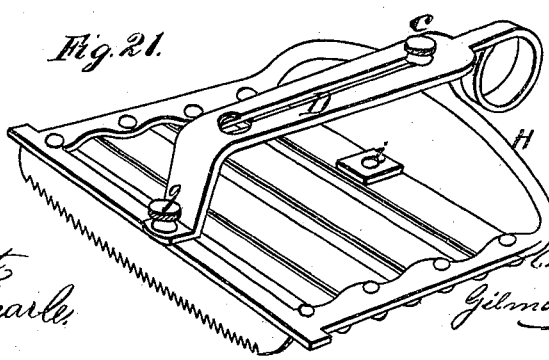
WITNESSES
INVENTOR,
ATTORNEYS.

C. A. HOTCHKISS.
CURRY-COMB.

No. 174,907. Patented March 21, 1876.

WITNESSES
Robert Everett
Chas. M. Searle

INVENTOR.
Charles A. Hotchkiss.
Gilmore, Smith & Co.
ATTORNEYS.

C. A. HOTCHKISS.
CURRY-COMB.

Patented March 21, 1876.

WITNESSES
Robert Everett
Chas. R. Searle

INVENTOR,
Charles A. Hotchkiss.
Gilmore, Smith & Co.
ATTORNEYS

N. PETERS, PHOTO-LITHOGRAPHER, WASHINGTON, D.C.

UNITED STATES PATENT OFFICE.

CHARLES A. HOTCHKISS, OF BRIDGEPORT, CONNECTICUT.

IMPROVEMENT IN CURRY-COMBS.

Specification forming part of Letters Patent No. 174,907, dated March 21, 1876; application filed March 4, 1876.

*To all whom it may concern:*

Be it known that I, CHARLES A. HOTCHKISS, of Bridgeport, in the county of Fairfield and State of Connecticut, have invented a new and valuable Improvement in Curry-Combs; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of perspective views of my curry-comb; and Figs. 3, 4, 5, 6, and 7 are detail views thereof. Figs. 8, 9, 10, 11, 12, 13, 14, 15, 16, 17, 18, 19, 20, 21, 22, 23, 24, 25, and 26 are views of modifications of my curry-comb, and of details of the modifications.

This invention has relation to curry-combs; and the nature of my invention consists in a curry-comb, the handle or grasping device of which can be adjusted over the back of the comb, or on one side thereof, as will be hereinafter explained.

Prior to the invention which I am about to describe, curry-combs have been made with both a grasping-handle, raised over their backs, and side handles, either of which could be used at pleasure. Such handles were immovably secured to the combs, and were not interchangeable. My object is to make a single handle or grasping device serve the twofold purpose of a side handle and also a raised grasping-handle over the back of the comb.

In the annexed drawings, (Fig. 1,) A designates the back frame of a curry-comb, to which serrated plates C are secured; and B designates a standard, rising from a part of said frame. I will here remark that my invention is applicable to the close-back curry-comb, as well as to combs having open backs. D, Figs. 1, 2, and 6, designates a handle or grasping device, which is slotted longitudinally, as shown at $a$, and constructed with a depressed portion, $d$, the lower end of which is received into a notch or recess in frame A, when the handle is adjusted as shown in Fig. 1. The slot $a$ receives through it a guide, $b$, and also a thumb-screw, $c$, both of which are tapped into a shelf-extension of the standard B.

The handle D can be adjusted, as indicated in dotted lines, by simply loosening the screw $c$, in which position it can be secured by tightening this screw.

When handle D is adjusted for a side handle, a pin, $y$, may be used, which will enter a hole, $y'$, in the portion $d$ of the handle, and aid in keeping the parts rigidly connected.

Fig. 2 shows an endwise-adjustable handle, which differs from the handle of Fig. 1, in having a very short angular extension, $d$, which prevents the hand from casually slipping while using the comb.

Instead of forming the handle D with a long slot, $a$, it may be constructed, as shown in Figs. 3, 4, 5, and 7, with short slots, or with perforations to receive screws or pins for fastening it to the standard B over the comb, or to one side thereof.

The handle shown in Fig. 6 is slotted nearly its full length, and at two points circular depressions $z\ z$ are made in it to receive the shoulder of the set-screw which binds the handle rigidly in its place.

Fig. 8 shows a curry-comb, the handle of which is constructed with a lip, $d'$, on the portion $d$, which can be secured to extensions $f$ or $f'$ on the frame A, by means of a thumb-nut, $g$, or a set-screw, $g$.

Figs. 9, 10, and 11 show handles D, which are detachable, and can be fixed to either side of the back of the comb, so as to afford a grasping-handle over the back, or a side handle.

Fig. 13 shows modifications of the handle D of Fig. 8.

Fig. 14 shows a wooden portion, G, secured to a slotted plate, which is endwise adjustable; and Fig. 15 shows the slotted plate adapted for the wooden handle.

Fig. 16 shows a comb having lateral braces H and guideways J secured to its back. The guideways receive the T-shaped end of the handle D, which is in this case slotted longitudinally, and secured to the braces H by means of a set-screw.

Figure 1:
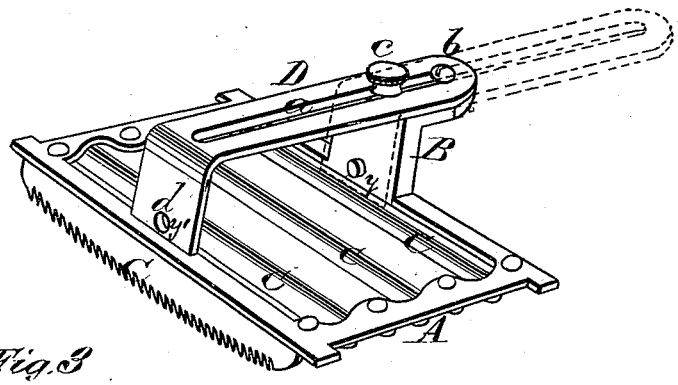
Figure 3:
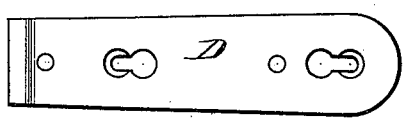
Figure 4:
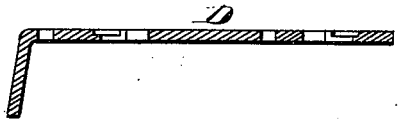
Figure 2:
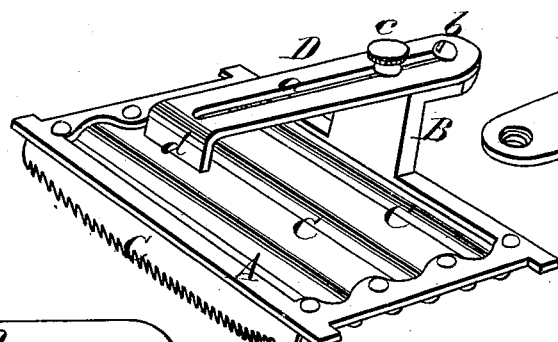
Figure 5:
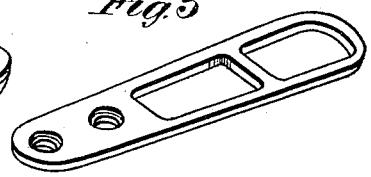
Figure 6:
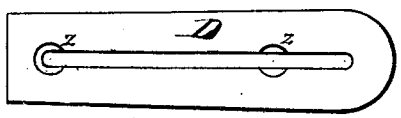
Figure 7:
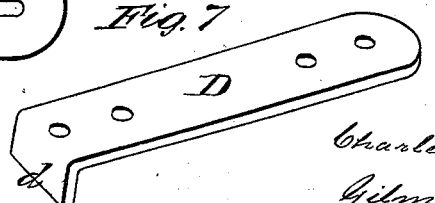

Figs. 18, 19, and 20 show modifications of the comb of Fig. 16. In Fig. 20 a turn-button, $h$, is applied at one end of the guideway for the handle, which enters a hole, $h'$, through the handle, and serves in connection with the screw $c$ to secure the handle rigidly in place when it is adjusted for a side handle.

Fig. 21 shows a handle having a thumb or finger ring on one end, which handle is slotted longitudinally, and secured to a bail or arched brace H by a set-screw, c, and to the front part of the frame of the comb by a set-screw, g. The drawing, Fig. 21, shows the handle across the back of the comb; but by loosening the screws g and c the handle may be adjusted back and used as a side handle. In this position of the handle the screw g will enter the hole i.

Figure 22:
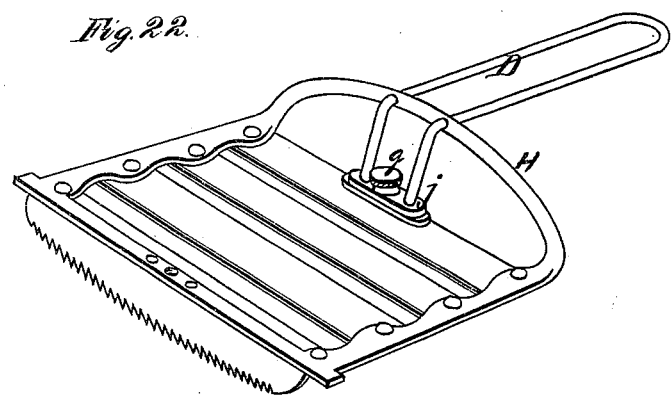
Figure 24:
Figure 23:
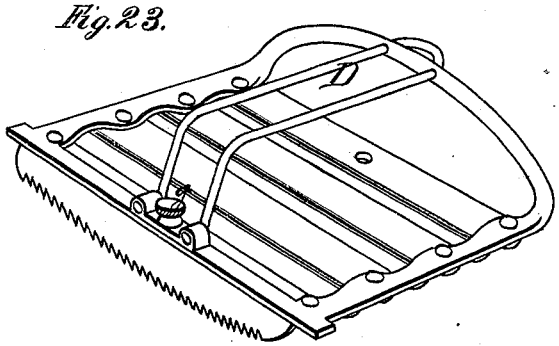

Figs. 22, 23, and 24 show a comb with an arched brace, H, through which a wire or looped handle passes and is allowed to slide. The ends of the wires of this handle are secured to an oblong plate, j, in any suitable manner, through which plate j set-screw g is tapped for the purpose of securing the handle in the position shown in Fig. 22, or in the position shown in Fig. 23.

When the handle-wires are passed down through the plate j, as shown in Figs. 22 and 24, the projecting ends of the wires may be inserted into holes made in the comb-frame for the purpose of making a more rigid attachment.

Figure 25:
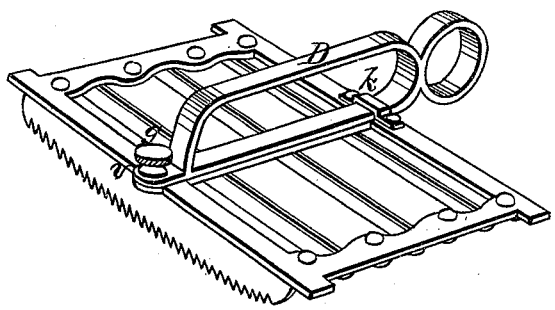
Figure 26:
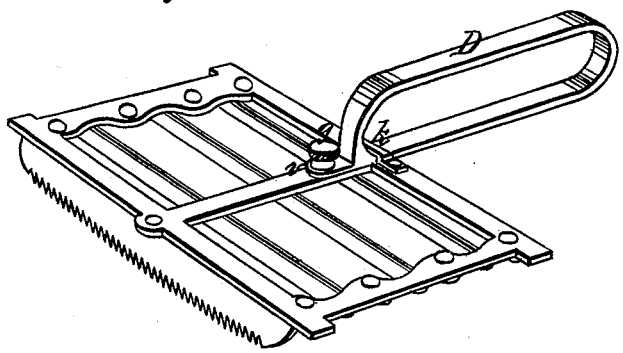

Another modification of my invention is represented by Figs. 25 and 26. This shows a looped handle, having a lip, v, on one end, through which a set-screw, g, is tapped. The lower or base portion of the handle passes through a staple, k, on one side of the comb-frame, which holds the handle at this point. When this looped handle is adjusted over or across the back of the comb, as shown in Fig. 25, the staple k holds it at one end, and the screw g holds it at the other end. When the handle is moved back to serve as a side handle, as shown in Fig. 26, the set-screw is inserted into the frame near the staple, and the handle is thus securely held.

If desired, the looped handle may have a finger-ring formed on one end, as shown in Fig. 25.

I have now described several practical modes of carrying my invention into effect; but I do not wish to be understood as confining myself to these devices, as I believe myself to be the first who has ever made a grasping-handle, raised over the back of a curry-comb, which could be changed into a side handle.

It is obvious that enlarged handles of wood or other suitable materials may be secured to the metal portions d, herein denominated handles.

I contemplate the use of thumb-rings on the handles wherever they are applicable.

What I claim as new, and desire to secure by Letters Patent, is—

1. A curry-comb which is provided with an adjustable device that will serve the double purpose of a side handle and also a raised grasping-handle over the back of the comb.

2. An endwise-movable handle, D, combined, substantially as described, with a curry-comb.

In testimony that I claim the above I have hereunto subscribed my name in the presence of two witnesses.

CHARLES A. HOTCHKISS.

Witnesses:
JOHN F. ACKER, Jr.,
ROBERT EVERETT.